(12) United States Patent
Que

(10) Patent No.: US 9,383,507 B1
(45) Date of Patent: Jul. 5, 2016

(54) BACKLIGHT UNIT

(71) Applicant: Shenzhen China Star Optoelectronics Technology Co. Ltd., Shenzhen, Guangdong (CN)

(72) Inventor: Chengwen Que, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 14/443,392

(22) PCT Filed: Mar. 4, 2015

(86) PCT No.: PCT/CN2015/073612
§ 371 (c)(1),
(2) Date: May 17, 2015

(30) Foreign Application Priority Data

Feb. 10, 2015 (CN) .......................... 2015 1 0069687

(51) Int. Cl.
*F21V 8/00* (2006.01)

(52) U.S. Cl.
CPC .............. *G02B 6/0085* (2013.01); *G02B 6/005* (2013.01); *G02B 6/0021* (2013.01); *G02B 6/0073* (2013.01); *G02B 6/0088* (2013.01)

(58) Field of Classification Search
CPC .... G02B 6/0085; G02B 6/0021; G02B 6/005; G02B 6/0073; G02B 6/0088
See application file for complete search history.

(56) References Cited

U.S. PATENT DOCUMENTS

| | | | |
|---|---|---|---|
| 2010/0128194 A1* | 5/2010 | Cho | G02F 1/133615 349/58 |
| 2012/0033447 A1* | 2/2012 | Hashino | G02B 6/0086 362/612 |
| 2012/0087110 A1* | 4/2012 | Lee | G02B 6/009 362/97.3 |

* cited by examiner

*Primary Examiner* — Mary Ellen Bowman
(74) *Attorney, Agent, or Firm* — Andrew C. Cheng

(57) ABSTRACT

A BLU includes a plastic frame, a heat-dissipating plate, an LED light bar, a light guide, and an optical film. The plastic frame includes a first horizontal part and a first vertical part connected with the first horizontal part. The heat-dissipating plate includes a second horizontal part and a second vertical part. A first through hole penetrating the first horizontal part and the first vertical part is set on the plastic frame. A hook is set on the end of the second vertical part. The second vertical part is close to the first vertical part and the hook clasps the first horizontal part.

18 Claims, 2 Drawing Sheets

BACKLIGHT UNIT

TECHNICAL FIELD

The present invention relates to display field, and more particularly, to a backlight unit (BLU).

DESCRIPTION OF RELATED ART

A display device such as a liquid crystal display (LCD) usually includes a display panel and a backlight unit (BLU) to provide backlight of the display panel. In the conventional backlight module of narrow bezel, the designer usually set the plastic frame on the incident side directly on the fin. The fin is, however, the aluminum extruded material so it needs other auxiliary fixing structures. The art is complicated and the cost is higher.

Referring to FIG. 1, one of the conventional fixing methods is that a plastic frame 1 is artificially forced downward (Z direction in FIG. 1) to insert a fin 2 into a recess 1a of the plastic frame 1 when assembling. The plastic frame 1 is locked on the lateral wall of the fin 2 by screws (not shown) on a lot of positions for fixing the plastic frame 1. In artificial operation, the force, however, is hard to control uniformly so the deviation of the assembling on the opening of the plastic frame 1 is large. Because of the accuracy of the parts, a portion of the plastic frame 1 is deformed in the screwing process. The deformation of the plastic frame 1 cannot be suppressed in artificial operation so the dimension of a portion of the opening is hard to control and light leakage comes out at a portion of the backlight module. The performance of the backlight module is influenced.

SUMMARY

For solving the problem of the conventional technique, the present invention provides a BLU with a simple structure and good optical performance.

For achieving the aforementioned purpose, the present invention adopts the technique below.

A BLU includes a plastic frame, a heat-dissipating plate, an LED light bar, a light guide, and an optical film. The plastic frame includes a first horizontal part and a first vertical part connected with the first horizontal part. The heat-dissipating plate includes a second horizontal part and a second vertical part. A first through hole penetrating the first horizontal part and the first vertical part is set on the plastic frame. A hook is set on the end of the second vertical part. The second vertical part is close to the first vertical part and the hook clasps the first horizontal part.

The plastic frame further includes at least a second through hole set on the first vertical part. The heat-dissipating plate includes a protrusion set on the outer wall of the second vertical part, wherein the protrusion is embedded in the second through hole.

The plastic frame further includes at least a notch set on the first vertical part, wherein the recess is set next to the first through hole on the length direction of the first vertical part.

The recesses are set on the both sides of the first through hole.

A heat-conductive plate is set on the top surface of the second horizontal part.

An end of the first horizontal part close to the first through hole is a guiding bevel.

A rib is set on an end of the first horizontal part close to the first through hole, wherein the hook clasps the top surface of the rib via the guiding bevel.

The BLU further includes a fastening, wherein the fastening penetrates the first vertical part and the second vertical part in order and fixes the plastic frame and the heat-dissipating plate.

The BLU of the present invention includes the first through hole penetrating the first horizontal part and the first vertical part. The hook is set on the end of the second vertical part and extends inward. The second vertical part is close to the first vertical part and the hook clasps the first horizontal part so the plastic frame is fixed on the heat-dissipating plate well. This structure is simple and tight and the light leakage is avoided.

BRIEF DESCRIPTION OF THE DRAWINGS

The accompanying drawings are included to provide easy understanding of the application, are incorporated herein and constitute a part of this specification. The drawings illustrate embodiments of the application and, together with the description, serve to illustrate the principles of the application.

DESCRIPTION OF THE PREFERRED EMBODIMENTS

Figure 1:
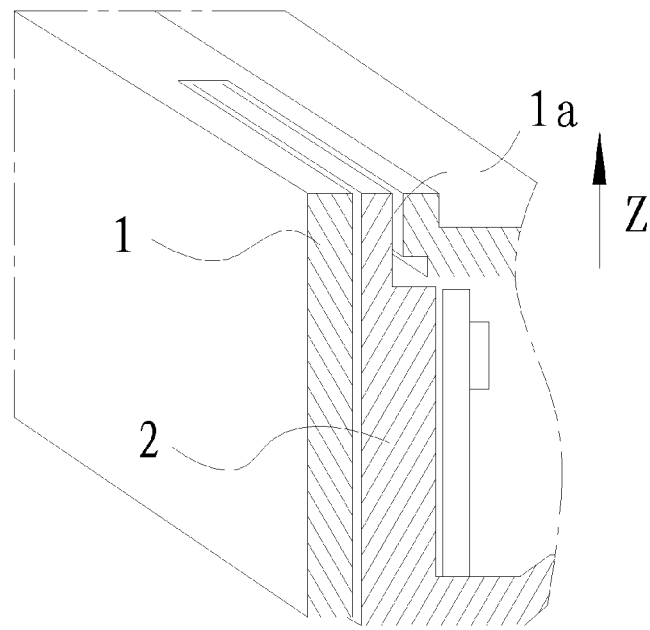
FIG. 1 is a schematic view of a conventional BLU structure.
Figure 2:
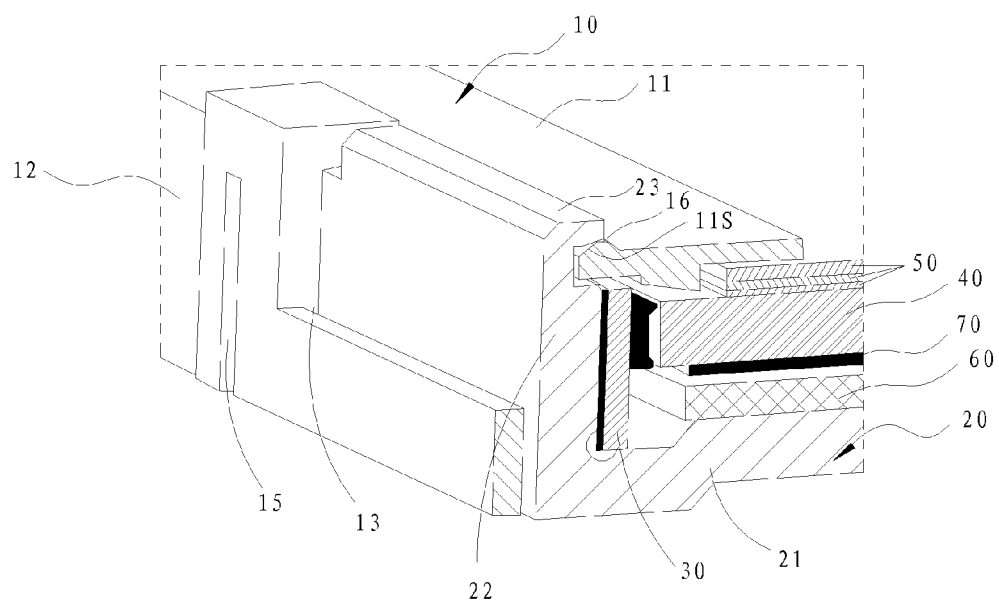
FIG. 2 is a schematic view of a BLU structure in accordance with an embodiment of the present invention.
Figure 3:
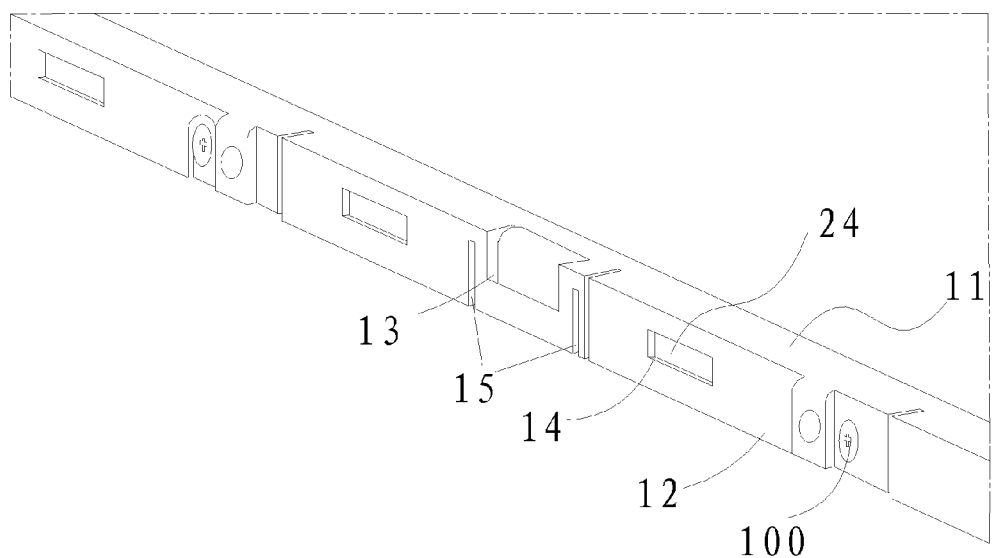
FIG. 3 is a schematic view of a plastic frame assembly structure in accordance with an embodiment of the present invention.

To better and concisely explain the disclosure, the same name or the same reference number given or appeared in different paragraphs or figures along the specification should has the same or equivalent meanings while it is once defined anywhere of the disclosure.

A backlight unit (BLU) includes a plastic frame 10, a heat-dissipating plate 20, an LED light bar 30, a light guide 40, and an optical film 50. The plastic frame 10 includes a first horizontal part 11 and a first vertical part 12 connected with the first horizontal part 11. The heat-dissipating plate 20 includes a second horizontal part 21 and a second vertical part 22. A first through hole 13 penetrating the first horizontal part 11 and the first vertical part 12 is set on the plastic frame 10. A hook 23 is set on an end of the second vertical part 22. The second vertical part 22 is close to the first vertical part 12 and the hook 23 clasps the first horizontal part 11.

The BLU in this embodiment includes the first through hole 13. The heat-dissipating plate 20 includes the hook 23 embedded in the first through hole 13. The hook 23 clasps the first horizontal part 11 and is connected with a top surface of the first horizontal part 11. In the assembling process, the plastic frame 10 is pressed downward to embed the hook 23 of the heat-dissipating plate 20 in the first through hole 13 of the plastic frame 10. The plastic frame 10 is pressed continually and the hook 23 is connected with a top surface of the first horizontal part 11 of the plastic frame 10.

The LED light bar 30, the light guide 40, and the optical film 50 are set in a space enclosed by the plastic frame 10 and the heat-dissipating plate 20. The plastic frame 10 further includes at least a second through hole 14 set on the first vertical part 12. The heat-dissipating plate 20 includes a protrusion 24 set on the outer wall of the second vertical part 22, wherein the protrusion 24 is embedded in the second through hole 14. On one hand, the hook 23 penetrates the first through hole 13 and is connected with a top surface of the first horizontal part 11. On the other hand, the protrusion 24 of the heat-dissipating plate 20 cooperates with the second through hole 14 of the plastic frame 10. The protrusion 24 is embedded in the second through hole 14 and the connection of the plastic frame 10 and the heat-dissipating plate 20 is tighter.

The plastic frame 10 further includes at least a notch 15 set on the first vertical part 12, wherein the recess 15 is set next to the first through hole 13 on the length direction of the first vertical part 12. The elasticity of the first vertical part 12 of the plastic frame 10 can be increased and the assembling of the plastic frame 10 and the heat-dissipating plate 20 is easier. The recesses 15 are set on the both sides of the first through hole 13.

A reflective sheet 70 is attached to the bottom surface of the light guide 40 and a heat-conductive plate 60 is set on the top surface of the second horizontal part 21 simultaneously. For the hook 23 clasping the heat-dissipating plate 20 accurately and conveniently, an end of the first horizontal part 11 close to the first through hole 13 is a guiding bevel 11S. A rib 16 is set on an end of the first horizontal part 11 close to the first through hole 13, wherein the hook 23 clasps the top surface of the rib 16 via the guiding bevel 11S. The reliability of installation of the hook 23 is improved because of the existence of rib 16.

At the same time, a fastening 100 penetrates the first vertical part 20 and the second vertical part 22 in order and fixes the plastic frame 10 and the heat-dissipating plate 20 relatively. The second location of the plastic frame 10 and the heat-dissipating plate 20 is performed and the fix thereof under force is ensured.

Because of the hook 23 and the protrusion 24, the great deformation of the plastic frame 10 cannot be performed when fixing by the fastening 100 such as a screw and the deformation of the plastic frame 10 is suppressed. The deformation of the opening of the plastic frame 10 relative to the heat-dissipating plate 20 is decreased and the probability of light leakage is reduced.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A backlight unit comprising: a plastic frame; a heat-dissipating plate; an LED light bar; a light guide; and an optical film, wherein the plastic frame comprises a first horizontal part and a first vertical part connected with the first horizontal part, the heat-dissipating plate comprises a second horizontal part and a second vertical par, a first through hole penetrating the first horizontal part and the first vertical part is set on the plastic frame, a hook is set on the end of the second vertical part, the second vertical part is close to the first vertical part, and the hook clasps the first horizontal part.

2. The backlight unit of claim 1, wherein the plastic frame further comprises at least a second through hole set on the first vertical part, and the heat-dissipating plate comprises a protrusion set on an outer wall of the second vertical part, wherein the protrusion is embedded in the second through hole.

3. The backlight unit of claim 1, wherein the plastic frame further comprises at least a notch set on the first vertical part, and the recess is set next to the first through hole on the length direction of the first vertical part.

4. The backlight unit of claim 3, wherein the recesses are set on the both sides of the first through hole.

5. The backlight unit of claim 1, wherein the second horizontal part comprises a heat-conductive plate set on the top surface of the second horizontal part.

6. The backlight unit of claim 1, wherein an end of the first horizontal part close to the first through hole is a guiding bevel.

7. The backlight unit of claim 6, wherein the first horizontal part comprises a rib set on the end of the first horizontal part close to the first through hole, wherein the hook clasps the top surface of the rib via the guiding bevel.

8. The backlight unit of claim 1, further comprising a fastening, wherein the fastening penetrates the first vertical part and the second vertical part in order and fixes the plastic frame and the heat-dissipating plate.

9. The backlight unit of claim 2, wherein an end of the first horizontal part close to the first through hole is a guiding bevel.

10. The backlight unit of claim 9, wherein the first horizontal part comprises a rib set on the end of the first horizontal part close to the first through hole, wherein the hook clasps the top surface of the rib via the guiding bevel.

11. The backlight unit of claim 3, wherein an end of the first horizontal part close to the first through hole is a guiding bevel.

12. The backlight unit of claim 11, wherein the first horizontal part comprises a rib set on the end of the first horizontal part close to the first through hole, wherein the hook clasps the top surface of the rib via the guiding bevel.

13. The backlight unit of claim 4, wherein an end of the first horizontal part close to the first through hole is a guiding bevel.

14. The backlight unit of claim 13, wherein the first horizontal part comprises a rib set on the end of the first horizontal part close to the first through hole, wherein the hook clasps the top surface of the rib via the guiding bevel.

15. The backlight unit of claim 2, further comprising a fastening, wherein the fastening penetrates the first vertical part and the second vertical part in order and fixes the plastic frame and the heat-dissipating plate.

16. The backlight unit of claim 3, further comprising a fastening, wherein the fastening penetrates the first vertical part and the second vertical part in order and fixes the plastic frame and the heat-dissipating plate.

17. The backlight unit of claim 4, further comprising a fastening, wherein the fastening penetrates the first vertical part and the second vertical part in order and fixes the plastic frame and the heat-dissipating plate.

18. The backlight unit of claim 5, further comprising a fastening, wherein the fastening penetrates the first vertical part and the second vertical part in order and fixes the plastic frame and the heat-dissipating plate.

* * * * *